March 28, 1961 F. O. FRYE 2,977,018
UNDERWATER FUEL STORAGE
Filed March 4, 1960 2 Sheets-Sheet 1

INVENTOR.
FILMORE O. FRYE,
BY
McMorrow, Berman & Davidson
ATTORNEYS.

March 28, 1961 F. O. FRYE 2,977,018
UNDERWATER FUEL STORAGE
Filed March 4, 1960 2 Sheets-Sheet 2
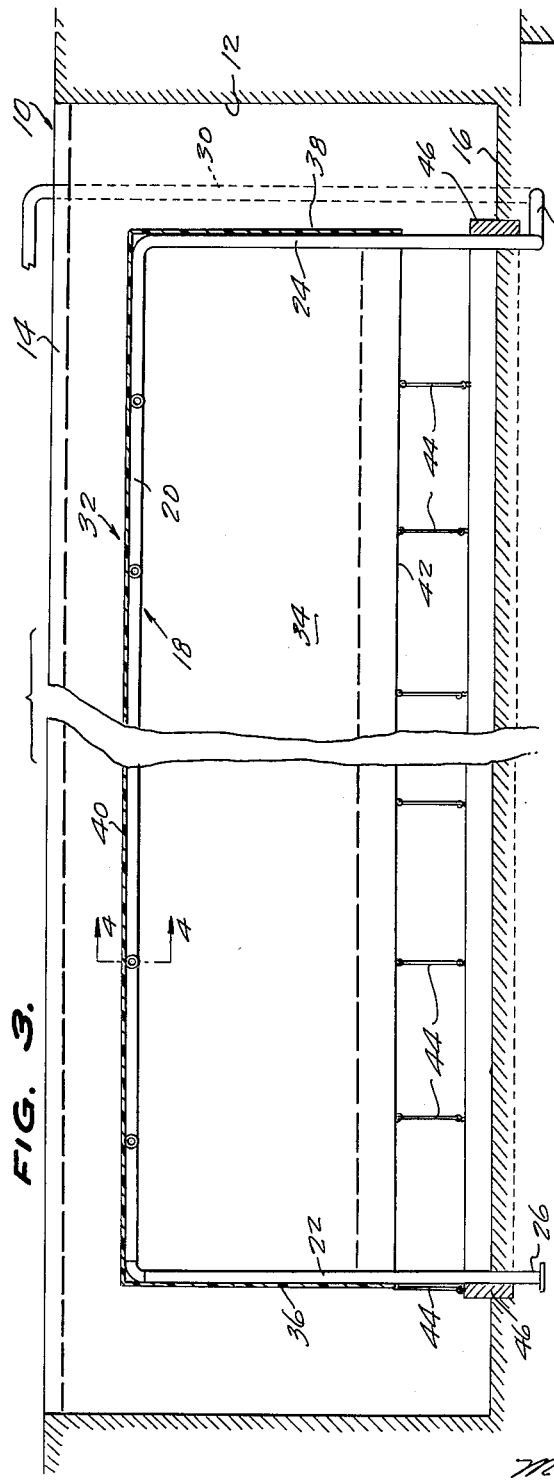
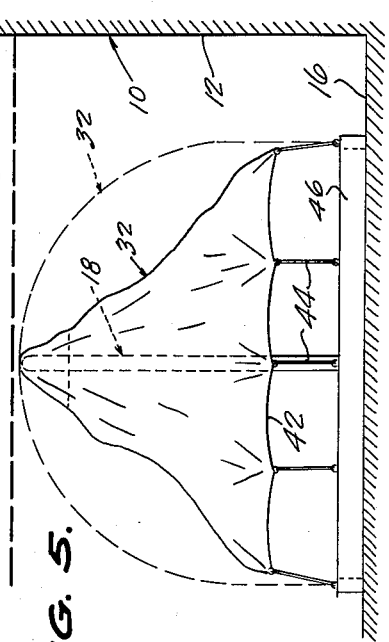
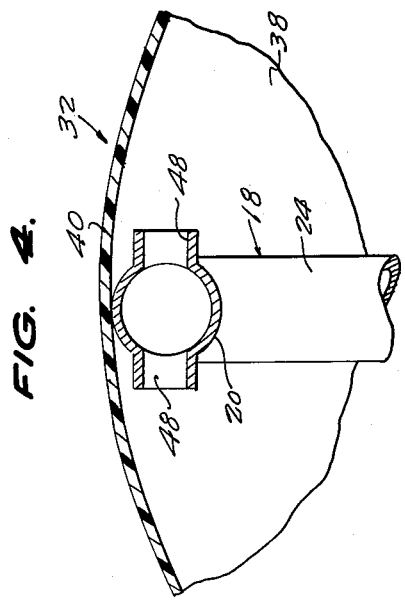
INVENTOR.
FILMORE O. FRYE,
BY
McMorrow, Berman + Davidson
ATTORNEYS.

United States Patent Office 2,977,018
Patented Mar. 28, 1961

2,977,018

UNDERWATER FUEL STORAGE

Filmore O. Frye, 42 W. Blaine St., McAdoo, Pa.

Filed Mar. 4, 1960, Ser. No. 12,799

2 Claims. (Cl. 220—13)

This invention relates to novel apparatus for underwater storage of liquid fuel, such as gasoline and crude oil, having a specific gravity lower than that of water.

The primary object of the invention is to provide more efficient and practical means for storing liquid fuel under water, whether on land or off-shore in a body of water, which, besides obtaining the well known advantages of underwater storage of fuel, affords the additional advantages of economical construction, in different shapes, from readily available, low cost, and noncritical materials, and easy collapsibility for transportation.

Another object of the invention is to provide storing means of the character indicated above, wherein a collapsible fuel container is anchored to the bottom of a body of water on the bottom of a land excavation, the container being enclosed by a water reservoir, the container being open at its bottom to the reservoir, whereby leakage of fuel from the container is retained in and is removable from the reservoir, and wherein, in the event of fuel catching fire in the container or in the reservoir, the fire and its products of combustion are confined by and within the reservoir.

Other important objects and advantageous features of the invention will be apparent from the following description and the accompanying drawings, wherein, for purposes of illustration only, a specific form of the invention is set forth in detail.

In the drawings:

Figure 3 is a contracted and enlarged vertical longitudinal section taken on the line 3—3 of Figure 2;

Figure 4 is a further enlarged fragmentary vertical transverse section taken on the line 4—4 of Figure 3; and, Figure 5 is a view substantially like Figure 2, showing the fuel container in collapsed condition.

Figure 1:
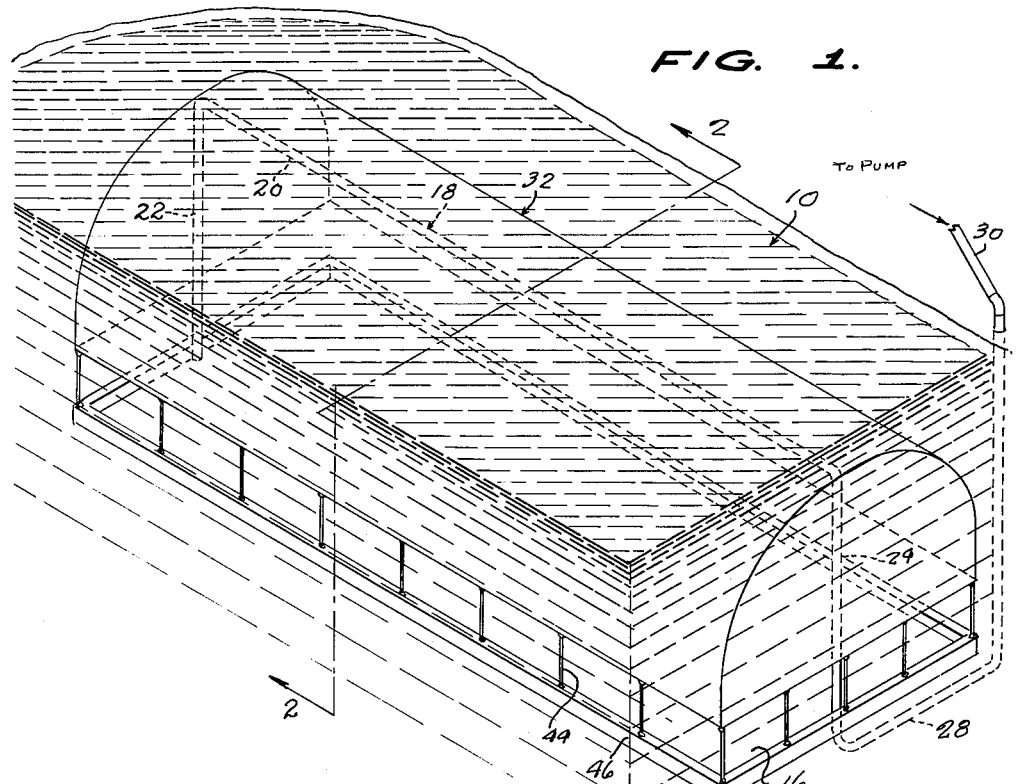
Figure 1 is a perspective view of apparatus of the present invention, in a land installation.

Referring in detail to the drawings, wherein like numerals designate like parts throughout the several views, the numeral 10 generally designates a water reservoir, here shown as being a land excavation, having sidewalls 12, an open top 14, and a bottom wall 16. In the case of an off-shore installation, the reservoir 10 would be an enclosure made of suitable material and shape and anchored to the bottom of the body of water, in which case the bottom wall 16 could be constituted by such water bottom.

An inverted U-shaped ridge pipe 18 having a horizontal bight portion 20 and depending legs 22 and 24, is anchored to the bottom wall 16, as by embedding a flanged closed lower end 26 of the leg 22 in the bottom wall, as by concreting the bottom wall, and embedding therein, a lateral horizontal arm 28, on the lower end of the leg 24, the arm 28 terminating in an upstanding pipe 30. The pipe 30 extends upwardly above the reservoir top 14, and is adapted to be connected to pumping means (not shown) for withdrawing and introducing liquid fuel.

Positioned spacedly within the reservoir 10 and supportably engaged over the ridge pipe 18, is an open bottom collapsible fuel container 32, which is made of suitable flexible and impervious reinforced material, and has sidewalls 34, and walls 36 and 38, and a top wall 40. The container 32 is shown as being horizontally and longitudinally elongated, with an upwardly tapered, rounded top wall 40, but the container can be of any other suitable upwardly tapering shape and dimensions.

The container 32 is placed over the bight portion 20 of the ridge pipe 18, with its end walls 36 and 38 disposed at the outer sides of the legs 22 and 24, respectively, and with its sidewalls spaced equally at opposite sides of the ridge pipe, the walls of the container being shorter than the legs 22 and 24, so that the common lower edge 42 of the container is spaced above the bottom wall 16; and with the top wall 40 spaced downwardly from the top wall 14 of the reservoir 10. Spaced cables 44, or the like, are secured to the lower edge 42 and to the bottom wall 16, as by means of anchors 46 embedded in the bottom wall.

Figure 2:
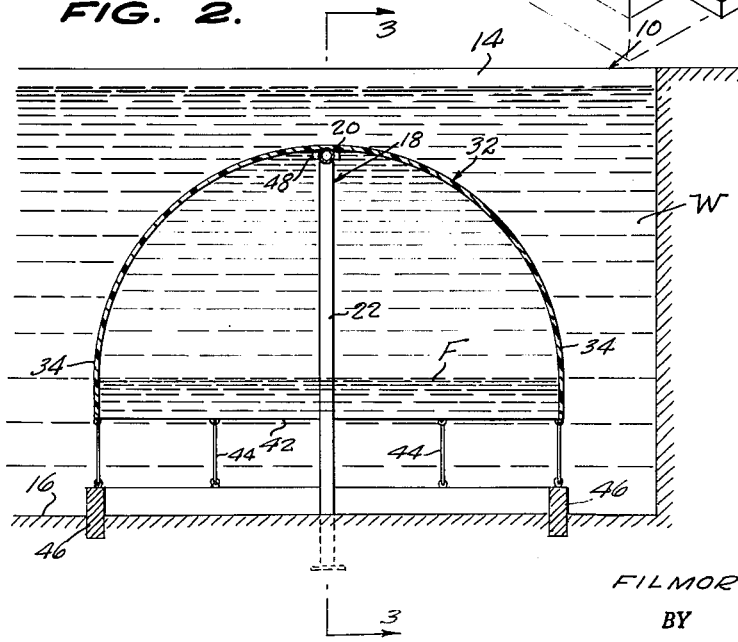
Figure 2 is a vertical transverse section taken on the line 2—2 of Figure 1.

As shown in Figures 2 to 4, the bight portion 20 of the ridge pipe 18 has spaced therealong lateral nozzles 48, which are combined outlets and inlets to the ridge pipe.

To put the apparatus in operation, water W is introduced into the reservoir 10, until water fills the reservoir and fills and expands the container 32, as shown in Figure 2, and the water has a level in the reservoir above the container 32. Liquid fuel F is then pumped into the container 32, through the stand pipe 30 and the ridge pipe 18 and displaces a corresponding volume of water from the container 32 into the reservoir 10 by rising in the container 32 by reason of being lighter in weight than the water. Whenever fuel is drawn off from the container 32 through the pipes 18 and 30, as by pumping suction applied to the pipe 30, such fuel is replaced in the container 32 by water from the reservoir 10. In the event that fuel leaks from the container 32 into the reservoir 10, the same, whether liquid or volatile product of the fuel, is safely retained within the reservoir, and can be easily recovered from the reservoir, if desired. It will be evident that should the fuel F within the container 32 catch fire, from any cause, the fire will be confined in and smothered within the reservoir 10.

While there has been shown and described herein a preferred form of the invention it is to be understood that the invention is not necessarily confined thereto, and that any change or changes in the structure of and in the relative arrangements of components thereof are contemplated as being within the scope of the invention as defined by the claims appended hereto.

What is claimd is:

1. Apparatus for underwater storage of liquid fuel lighter than water, comprising a reservoir containing water, said reservoir having a sidewall and a bottom wall, an open bottom flexible walled fuel container spacedly positioned within the reservoir, anchoring means extending between the container and the bottom wall and spacing the open bottom of the container from the bottom wall, and conduit means opening within the container and leading out of the container and to the top of the reservoir above the water therein, said container being rectangular and having first and second end walls, sidewalls, and a transversely curved top wall, said conduit means comprising a longitudinally elongated ridge pipe within the container having a horizontal bight portion and first and second depending legs anchored at their lower ends to said bottom wall, and an upstanding pipe outside of the container end connected to said second leg and rising above the reservoir, said bight portion being supportably engaged with the underside of the top wall of the container and said first and second legs being supportably and severally engaged with the inner sides of said first and second end walls of the container.

2. Apparatus for underwater storage of liquid fuel lighter than water, comprising a reservoir containing water, said reservoir having a sidewall and a bottom wall, an open bottom flexible walled fuel container spacedly positioned within the reservoir, anchoring means extending between the container and the bottom wall and spacing the open bottom of the container from the bottom wall, and conduit means opening within the container and leading out of the container and to the top of the reservoir above the water therein, said container having a top wall, said conduit means including a longitudinally-elongated ridge pipe within the container having a horizontal bight portion and first and second depending legs, the horizontal bight portion of said pipe being adjacent to and extending along said top wall with the lower ends of said depending legs being anchored to said bottom wall, and an upstanding pipe outside of the container and connected to one of said legs of said pipe.

References Cited in the file of this patent
UNITED STATES PATENTS

| | | |
|---|---|---|
| 239,066 | Shepard | Mar. 22, 1881 |
| 1,859,322 | Wilson | May 24, 1932 |
| 2,536,320 | Smith | Jan. 2, 1951 |
| 2,647,657 | Krupp | Aug. 4, 1953 |
| 2,798,639 | Urban | July 9, 1957 |
| 2,915,097 | Lewis | Dec. 1, 1959 |
| 2,924,350 | Greer | Feb. 9, 1960 |

FOREIGN PATENTS

| | | |
|---|---|---|
| 860,130 | France | Sept. 24, 1940 |